10-28-75 XR 3,915,576

United States Patent [19]
Taylor

[11] 3,915,576
[45] Oct. 28, 1975

[54] METHOD AND APPARATUS FOR CENTERING A CIRCULAR DISC

[75] Inventor: David Frank Taylor, Redondo Beach, Calif.

[73] Assignee: MCA Disco-Vision, Inc., Universal City, Calif.

[22] Filed: Sept. 30, 1974

[21] Appl. No.: 510,150

[52] U.S. Cl. ................ 356/172; 250/550; 356/110; 356/111; 356/138; 356/153
[51] Int. Cl.² ........................................ G01B 11/00
[58] Field of Search ............ 250/550; 356/110, 111, 356/138, 140, 153, 154, 172

[56] References Cited
UNITED STATES PATENTS 3,419,898 12/1968 Baldwin et al. .................... 356/110
3,518,007 6/1970 Ito ........................................ 250/550

*Primary Examiner*—Paul A. Sacher
*Assistant Examiner*—Richard A. Rosenberger
*Attorney, Agent, or Firm*—Marvin H. Kleinberg

[57] ABSTRACT

An optical system for locating the center of concentric spiral or circular information tracks on a videodisc detects the central maximum of the diffraction pattern resulting when the disc is illuminated by light from a point source. Because the central maximum coincides with an extended straight line connecting the point source and the center of the tracks, determination of the position of the central maximum permits the center of either opaque or transparent discs to be located accurately.

15 Claims, 2 Drawing Figures

METHOD AND APPARATUS FOR CENTERING A CIRCULAR DISC

RELATED COPENDING APPLICATIONS

"Video Disc Player" by James E. Elliott, Ser. No. 465,823, filed May 1, 1974;

"Focusing System for Videodisc Player" by James E. Elliott, Ser. No. 454,130, filed Mar. 25, 1974;

"Video Recording and Reproducing System" by Kent D. Broadbent, Ser. No. 437,750, filed Jan. 28, 1974;

"Video Recording and Reproducing System" by Kent D. Broadbent, Ser. No. 437,749, filed Jan. 28, 1974;

"Video Recording and Reproducing System" by Kent D. Broadbent, Ser. No. 437,604, filed Jan. 28, 1974;

"Head Height Control System" by Lawrence S. Canino, Ser. No. 413,165, filed Nov. 5, 1973;

"Replication Utilizing a Casting Process" by Manfred H. Jarsen, Ser. No. 406,686, filed Oct. 15, 1973;

"Method of Creating a Replicating Matrix" by Avanzado and Jarsen, Ser. No. 402,637, filed Oct. 1, 1973;

"Reading Head for Video Disc Player" by Manfred H. Jarsen, Ser. No. 402,635, filed Oct. 1, 1973;

"Method of Creating a Replicating Matrix" by Manfred H. Jarsen, Ser. No. 402,636, filed Oct. 1, 1973;

"Fluid Cushion Turntable for Video Disc Player" by Manfred H. Jarsen, Ser. No. 402,634, filed Oct. 1, 1973;

"Video Disc Mastering System" by John S. Winslow, Ser. No. 333,560, filed Feb. 20, 1973;

"Video Disc Player" by James E. Elliott, Ser. No. 314,082, filed Dec. 11, 1972;

"Video Disc Player" by James E. Elliott, Ser. No. 299,893, filed Oct. 24, 1972;

"Video Recording and Recording and Reproducing System" by Kent D. Broadbent, Ser. No. 299,892, filed Oct. 24, 1972;

"Drop-Out Compensator" by Wayne Ray Dakin, Ser. No. 299,891, filed Oct. 24, 1972;

"Video Record Disc and Process for Making Same" by David P. Gregg, Ser. No. 735,007, filed Jan. 27, 1969

BACKGROUND OF THE INVENTION

The present invention relates to disc manufacturing techniques and more particularly to a method and apparatus for accurately locating the center of a circular disc with information stored thereon in a concentric pattern.

Video signals such as are used in transmitting television broadcasts may be stored on a videodisc for later playback.

A video disc, such as disclosed in the prior art, may be 12 inches in diameter with a center information-free area approximately 6 inches in diameter. Between the center clear area and the outer edge, the video information is stored in the form of a circular, spiral track consisting of about 40,000 revolutions. The width of the track, as presently envisioned, is one micron, and adjacent tracks are separated by two microns, from center to center.

The techniques for recording the information on the videodisc, for playing it back, and for reproducing the discs are described in the following United States patents:

"Photoelectric Transducer Head," U.S. Pat. No. 3,349,273, issued Oct. 14, 1967, by David P. Gregg;

"Transparent Recording Disc," U.S. Pat. No. 3,430,966, issued Mar. 4, 1969, by David P. Gregg;

"Videodisc Playback Assembly," U.S. Pat. No. 3,518,442, issued June 30, 1970, by Keith O. Johnson;

"Video Signal Transducer . . . ," U.S. Pat. No. 3,530,258, issued Sept. 22, 1970, by Gregg and Johnson;

"Duplicating Process for Video Disc Records," U.S. Pat. No. 3,658,954, issued Apr. 25, 1972, by Kent D. Broadbent;

"Duplicating Process for Video Disc Records," U.S. Pat. No. 3,687,664, issued Aug. 29, 1972, by Kent D. Broadbent;

"Articulated Mirror," U.S. Pat. No. 3,794,410, issued Feb. 26, 1974, by James E. Elliott.

In the several alternative processes envisioned for reproducing the discs, the information channels are impressed on a sheet of clear plastic but the geometric center of the disc is not marked. Because of the small dimensions of the information tracks, it is essential that the center of the videodisc be located and punched with considerable accuracy. The present invention addresses the problem of locating accurately the center of the pattern of information tracks on the videodisc.

SUMMARY OF THE INVENTION

Videodiscs are produced in quantity from a "master" disc. The replica discs are made from transparent material and in a preferred embodiment have an outside diameter of approximately 12 inches and an inner clear area at the center of approximately 6 inches in diameter. Between this center clear area and the circumference of the disc lie the information tracks or channels which contain the video information. These tracks are very small, on the order of 1 micron in width, and the tracks are separated a distance of 2 microns between their centers.

Altogether, there may be 40,000 tracks or revolutions recorded on a disc. Along each track, the information is stored in the form of surface discontinuities such as "holes" or "bumps" which have been formed by techniques described in the above references. The spacing and size of these discontinuities represents the information that is stored on the disc.

It can be readily appreciated that if the center hole, into which a spindle is inserted for rotation during the playback process, is not rather accurately located, any eccentricity will cause the information tracks to oscillate from side to side beneath the playback transducer as the disc rotates. Small amounts of eccentricity, not exceeding 12 microns can be tolerated and corrected by the playback apparatus. Larger eccentricities may exceed the capacity of the system to correct and hence will adversely affect playback.

The apparatus used in replicating the videodiscs does not readily lend itself to marking the center of the replica disc. One method of producing video discs employs a stamping, pressing or embossing technique utilizing individual plastic discs. Other methods contemplate a continuous, web process for applying the substantially circular information patterns on an endless web. The present invention teaches a technique and apparatus that can be used to locate the center with considerable accuracy.

The present invention takes advantage of the small dimensions of the information track and the regularity of the spacing of the information tracks to make use of an optical technique for locating the center. It has been found that the videodisc acts as a diffraction grating. Light incident upon the disc from a point source will be diffracted in a predictable pattern according to the laws of optics.

Although the details of the diffraction pattern are complicated to describe, the essential feature which permits operation of the present invention is relatively easy to understand. The location of the central maximum of intensity of a diffraction pattern depends on the symmetry of the disc and on the location of the point source of illuminating light, relative to the center of the information tracks.

Specifically, the central maximum is found to lie on an extended straight line connecting the point source and the center of the disc. A central maximum can be detected at any distance from the disc. Once the central maximum has been accurately located, a line joining the point light source and the central maximum will intersect the videodisc at the center of the information tracks.

When it is desired to locate the center of a transparent disc, a detector is placed on the opposite side of the disc from the point source and light transmitted through the disc is detected. A baffle must be provided to prevent undiffracted light which has passed through the clear area at the center of the disc from entering the detector.

If the disc has been metallized, as it would be at a later stage in the manufacturing process, it will be opaque and highly reflective. Although this prevents the use of transmitted light, a technique using reflected light may be used to locate the center. The light source and detector must be positioned on the same side of the disc as contains the tracks. Light from the point source is diffracted as it is reflected by the tracks on the disc. As with the transparent disc, a baffle is desirable to prevent undiffracted light reflected from the center of the disc from reaching the detector.

In practice, a punch and die is accurately positioned to punch a hole whose center lies on the line connecting the point source and the pinhole aperture of the detector. In practice, this line is set up to be perpendicular to the plane of the disc. During the search for the central maximum, the disc may be moved relative to the fixed point source, detector, punch and die. Alternatively, the disc may be held stationary and the source, detector, punch, and die may be moved as a unit. The former mode is preferable if the discs may be handled individually; i.e., if they have been produced individually by a stamping, pressing, or embossing technique. On the other hand, if the discs are produced by a continuous web process it would not be possible to handle them individually and it would be preferable to hold the disc stationary and to move the apparatus relative to the disc.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENTS

Figure 1:
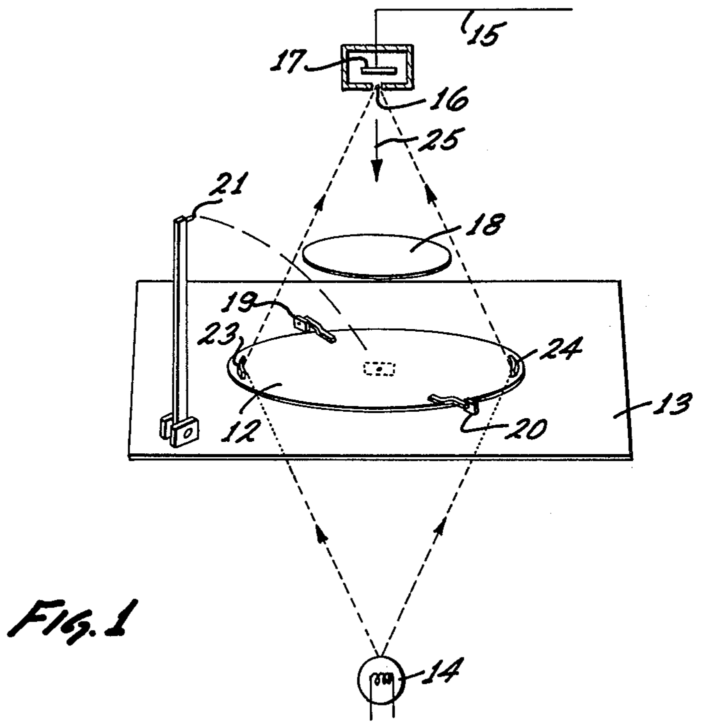
FIG. 1 is a schematic view of apparatus utilizing the optical centering technique with a transparent videodisc.

FIG. 1 shows the preferred embodiment of the present invention intended for use with a transparent videodisc. The disc 12 is placed on a transparent plane surface 13. A short arc lamp serves as a point source 14. On the opposite side of the disc from the point source, light-measuring means 15 are positioned at a predetermined distance from the disc.

Light-measuring means 15 comprises a pinhole aperture 16 through which light must pass to reach a photocell 17. The sensitive direction of the light-measuring means is indicated by the arrow 25. Typical light paths are shown by rays 14-23-16 and 14-24-16. The electrical output of the photocell can be read by a voltmeter (not shown) after suitable amplification. If ambient light presents a problem, it is possible to chop the light near the source and then to use electronic signal processing that responds only to the alternating component of the output.

Screening means in the form of a baffle 18 is provided to prevent undiffracted light which has passed through the clear center area of the disc from entering the detector. The disc may be held in place by holding pins 19 and 20 during the punching process in which a punch 21 is pushed into die 22.

It has been found experimentally that when the point source consists of a short arc lamp, a preferred distance of the light source from the disc is approximately 25 inches. The further away the lamp is from the disc, the more lax may be the tolerances on its position in the plane parallel to the disc. However, the further away the light source, the lower the intensity impinging on the disc and consequently, the detected signal will be of less magnitude.

A preferred spacing between the pinhole aperture and the disc has likewise been found by experiment. With a short arc lamp as the source, the optimum distance of the aperture to the disc is 4.5 inches. The closer the aperture to the disc, the more accurately its position in a plane parallel to the disc may be determined, but as the aperture is brought closer to the disc, the intensity of the light collected by it diminishes, and the optimum distance represents a compromise between these conflicting requirements.

Figure 2:
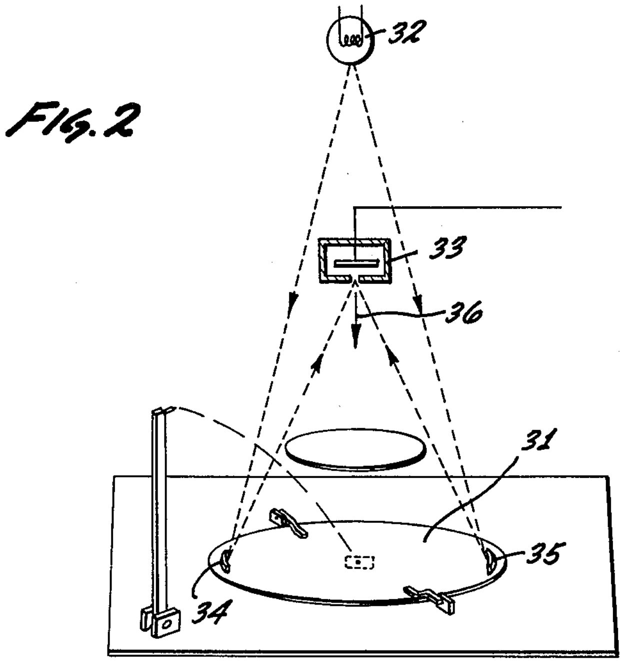
FIG. 2 is a schematic view of alternative apparatus use with a videodisc which has been metallized.

FIG. 2 shows the preferred embodiment for the case where the disc has been metallized, i.e., the surface of the disc which carries the information tracks has been coated with a thin vacuum-deposited layer of a reflective material such as aluminum. In this case, the disc 31 is supported on any opaque flat surface such as a table top, and the point source of light 32 and the light-measuring means 33 are both positioned on the same side of the disc that carries the information channels, as shown in FIG. 2. Again, typical light paths are shown by the rays 32-34-33 and 32-35-33, and the sensitive direction of the light-measuring means is shown by the arrow 36.

A number of refinements suggest themselves. For example, instead of a single movable point source of light, a plurality of fixed light sources could be used with only one light being activated at a particular moment. Similarly, instead of a single photodetector, a mosaic of light sensitive elements could be employed to facilitate automatic location of the central maximum of intensity.

Further, because the system is intended for use in the manufacturing process of replica discs, it would be highly desirable if the process of locating the maximum of intensity could be carried out automatically.

This could be accomplished by use of a servo system for seeking out and converging on the maximum, by translating the disc or the apparatus in response to the measured light intensity.

Regardless of whether the disc is metallized, and regardless of the refinements of the apparatus, the method for locating the center is essentially the same. The disc is illuminated with light from a point source located approximately on the axis of the disc. Light diffracted by the disc is detected by a detector having a very small "pinhole" aperture also located approximately on the axis of the disc.

Next, either the source and the detector as a unit, or the disc is moved in a search pattern until the light detected is a maximum. When the maximum has been found, the common center of the information tracks, which by definition is the center of the disc, lies on a straight line joining the point source with the pinhole aperture. Thereafter, the center may be marked or a centered hole may be punched in the disc.

While various embodiments of the technique have been suggested, it will be appreciated that still others could be used.

The scope of the invention need only be limited by the claims appended hereto.

What is claimed as new is:

1. A method for locating the center of the concentric, substantially circular information tracks on a surface of a videodisc, comprising the steps of:

a. positioning a point source of light on one side of the disc at a predetermined distance from the disc;
b. positioning light-measuring means a predetermined distance from the disc to receive light diffracted by the information tracks, said light-measuring means being aligned with said light source orthogonal to the plane of the disc; and
c. translationally moving the disc in its plane relative to a line joining the point source and the light-measuring means, to maximize the measured light;

whereby the disc is positioned with the center of its information tracks on the straight line joining the point source and the light-measuring means when the light measured is at a maximum.

2. The method of claim 1 above, further including the step of screening from the light-measuring means all light not diffracted by the information tracks.

3. The method of claim 1 above, wherein the videodisc is transparent and the light-measuring means are positioned a predetermined distance form the disc on the opposite side of the disc from the point source and oriented with their sensitive direction pointing toward the point source.

4. The method of claim 1 above, wherein the videodisc is opaque and the light-measuring means are positioned a predetermined distance from the same side of the disc as the point source and oriented with their sensitive direction orthogonal to the disc and away from the source.

5. The method of claim 1 above, wherein the relative motion between the disc and the line joining the point source and the light-measuring means is produced by translating the point source and the light-measuring means as a unit relative to the disc and in a direction parallel to the plane of the disc.

6. The method of claim 1 above, further including the additional step of marking the disc at a point where the line joining the point source and the light-measuring means intersects the disc when the measured light has been maximized.

7. The method of claim 1 above, further comprising the additional step of punching a hole in the disc, said hole having its center where the line joining the point source and the light-measuring means intersects the disc when the measured light has been maximized.

8. Apparatus for locating the center of concentric, substantially circular information tracks on a surface of a videodisc comprising:

a. a point source of light for illuminating the disc, positioned at a predetermined distance from the plane of the disc;
b. light-measuring means located a predetermined distance from the disc, and aligned with said light source, on a line orthogonal to said plane for detecting light diffracted by the information tracks;
c. means for supporting the disc in a plane, and
d. means for translating the disc in its plane relative to a line joining the point source with the light-measuring means;

whereby the center of the information tracks lies on the straight line joining the point source and the light-measuring means when the disc has been moved to a position in which the measured light intensity is a maximum.

9. The apparatus of claim 8 above, further including screening means for blocking all light not diffracted by the information tracks from reaching the light-measuring means.

10. The apparatus of claim 8 above, wherein the videodisc is transparent, and wherein the light-measuring means are located a predetermined distance from the disc on the opposite side of the disc from the point source and oriented with their direction pointing toward the point source.

11. The apparatus of claim 8 above, wherein the videodisc is opaque, and the light-measuring means are positioned a predetermined distance from the same side of the disc as the point source and oriented with their sensitive direction orthogonal to the disc and away from the point source.

12. The apparatus of claim 8 above, wherein means for translating further include means for moving the point source and light-measuring means as a unit relative to the disc and in a direction parallel to the plane of the disc.

13. The apparatus of claim 8 above, further including means for marking the disc at a point where the line joining the point source and the light-measuring means intersects the disc when the measured light has been maximized.

14. The apparatus of claim 8 above, further including means for punching a hole in the disc, said hole having its center where the line joining the point source and the light-measuring means intersects the disc when the measured light has been maximized.

15. The apparatus of claim 8 above, wherein the point source is a short arc lamp, wherein the predetermined distance of the point source from the plane of the disc is approximately 25 inches, wherein the predetermined distance of the light-measuring means from the plane of the disc is approximately 4.5 inches, and where the light-measuring means has a pinhole entrance aperture of 0.01 inches in diameter.

* * * * *